United States Patent
Maggi

(10) Patent No.: US 6,798,446 B2
(45) Date of Patent: Sep. 28, 2004

(54) METHOD AND SYSTEM FOR CUSTOM CLOSED-LOOP CALIBRATION OF A DIGITAL CAMERA

(75) Inventor: Sergio Maggi, San Mateo, CA (US)

(73) Assignee: Logitech Europe S.A. (CH)

( * ) Notice: Subject to any disclaimer, the term of this patent is extended or adjusted under 35 U.S.C. 154(b) by 247 days.

(21) Appl. No.: 09/902,538

(22) Filed: Jul. 9, 2001

(65) Prior Publication Data

US 2003/0007077 A1 Jan. 9, 2003

(51) Int. Cl.[7] .......................... H04N 5/225; H04N 17/00
(52) U.S. Cl. ................................ 348/207.99; 348/187
(58) Field of Search ..................... 348/207.99, 207.11, 348/333.04, 125, 129, 130, 175–190, 272

(56) References Cited

U.S. PATENT DOCUMENTS

| | | | | |
|---|---|---|---|---|
| 5,351,201 A | * | 9/1994 | Harshbarger et al. | .. 348/207.99 |
| 5,532,765 A | * | 7/1996 | Inoue et al. | ................. 348/177 |
| 5,657,079 A | * | 8/1997 | Thario et al. | ................ 348/190 |
| 5,821,993 A | * | 10/1998 | Robinson | ..................... 348/187 |
| 5,918,192 A | * | 6/1999 | Tomaszewski | ........... 348/231.6 |
| 6,014,168 A | * | 1/2000 | Webb et al. | ................. 348/190 |
| 6,437,823 B1 | * | 8/2002 | Zhang | ......................... 348/187 |

* cited by examiner

Primary Examiner—Andrew Christensen
Assistant Examiner—Nahn T. Tran
(74) Attorney, Agent, or Firm—Townsend and Townsend and Crew LLP

(57) ABSTRACT

A calibration system activates all or a majority of a display with the same value, such as with the same color. The camera is pointed at the display, but doesn't have to precisely pick up the whole display. The computer compares the pixel information received in the camera photosensor, and can store an appropriate correction factor. Not only does the user not have to precisely position the camera, jitter due to use hand movement is not a problem since this smoothes out the color information from the various pixels on the display, and actually improves the calibration. A target can be provided on the display to indicate if the user is properly pointing the camera at the display.

12 Claims, 3 Drawing Sheets

METHOD AND SYSTEM FOR CUSTOM CLOSED-LOOP CALIBRATION OF A DIGITAL CAMERA

BACKGROUND OF THE INVENTION

The present invention relates to the calibration of a digital camera, and in particular to calibration using feedback from a display.

Calibration is an issue for all types of imaging systems. For example, in scanners, it is typical to include a card which the user feeds into the scanner, with a card having different patterns and colors for calibration of the scanner. U.S. Pat. No. 6,141,121 shows a scanner which prints a color chart, and then scans its. U.S. Pat. No. 5,884,118 prints an image and then automatically feeds it to the scanning path for calibration.

U.S. Pat. No. 5,803,570 shows a camera picking up images from a projector by being in the projection path. This image is then fed back to the image generator controlling the projector to improve image quality.

Other methods exist for calibrating a display, such as a CRT. U.S. Pat. No. 4,754,329 shows a method for calibrating an oscilloscope display by placing a video camera over the oscilloscope screen, and providing the image to a separate monitoring display. U.S. Pat. No. 5,216,504 shows a camera which is used to provide a feed-back signal for a display. The feedback signal is used to adjust the settings for the red, green and blue guns of a CRT display, along with other adjustments.

U.S. Pat. No. 5,606,365 shows correction data for a camera being available from the factory and delivered electronically over a network, such as the internet. The camera can provide raw data to the computer which is then corrected with the downloaded correction data to provide a corrected display from the camera.

U.S. Pat. No. 5,918,192 teaches a calibration system where a camera is pointed at a display, and the picture the camera sees on the display is fed back to the computer. The pixels on the display are illuminated individually, or in groups, with the camera picking up the image. From the camera response, the computer can identify problem pixels of the camera and store a correction factor. This procedure should be done using a very good display at a factory, to insure the corrections are for the camera, not the display. The corrections can be shipped with a disk accompanying the camera. The user can perform the same procedure with the user's display, with this user procedure then correcting for variations in the pixels due to the user's particular display. However, this requires precise positioning of the camera to pick up and identify each pixel.

SUMMARY OF THE INVENTION

The present invention provides a calibration system that is practical and doesn't require precise positioning of the camera. All or a significant portion of the display is activated with the same value, such as with the same color value. The camera is pointed at the display, but doesn't have to precisely pick up the whole display. The computer compares the color information received by the camera with the color information sent to the display, and will adjust camera parameters until the comparison results in a match.

The camera is calibrated using a sequence of display feedback operations in one embodiment. All or part of the display is captured by the camera, and correction factors are stored to correct the value for each parameter (color, offset, brightness, etc.). For example, the correction factor for different colors can be adjusted, so that if a color value of 128 is sent to the display, the same value of 128 is detected by the camera. The process is then repeated, to see if the corrected numbers now match what is expected. If not, a further fine-tuning is done until the color numbers output from the camera equal the numbers provided to the display.

The present invention overcomes the shortcomings of the prior art to provide a practical system. Not only does the user not have to precisely position the camera, jitter due to use hand movement is not a problem since this smoothes out the color information from the various pixels on the display, and actually improves the calibration. Instead of trying to calibrate each pixel in a display, the invention calibrates based on the value of the whole display, or at least a majority of it. In one embodiment, the different values received at the camera sensor are averaged, with positions off by more than a predetermined amount being discarded (for portions of the camera sensor not pointed at the display, for example).

In one embodiment, a cross-hair or other target is provided on the display so the computer can tell where the camera is pointed, and make appropriate adjustments. To insure that a sufficient number of sensing pixels on the camera are used in the calibration, the user can be instructed, by a message on the display, to move the camera closer, or to the left, etc., so that the field of view of the camera includes enough the display.

In one embodiment, two calibration tables are provided. The first calibration is done at the factory for all cameras of a particular model. The factory calibration table is established with correction factors for each of the parameters tested (color, brightness, etc.) and is stored in the driver software. A customer can then set up the particular camera that customer purchases with that customer's own computer and monitor, and provide a customized calibration by pointing the camera at the display and going through the same steps. Any additional calibration required for that particular camera and that particular display is then stored in a customer calibration table, which is combined with the factory calibration values to provide the overall correction. In this manner, the factory calibration is maintained, and can be resorted to as a default in case the user wants to calibrate to a separate computer and display.

For a further understanding of the nature and advantages of the invention, reference should be made to the following description taken in conjunction with a couple of drawings.

DESCRIPTION OF THE SPECIFIC EMBODIMENTS

Figure 1:
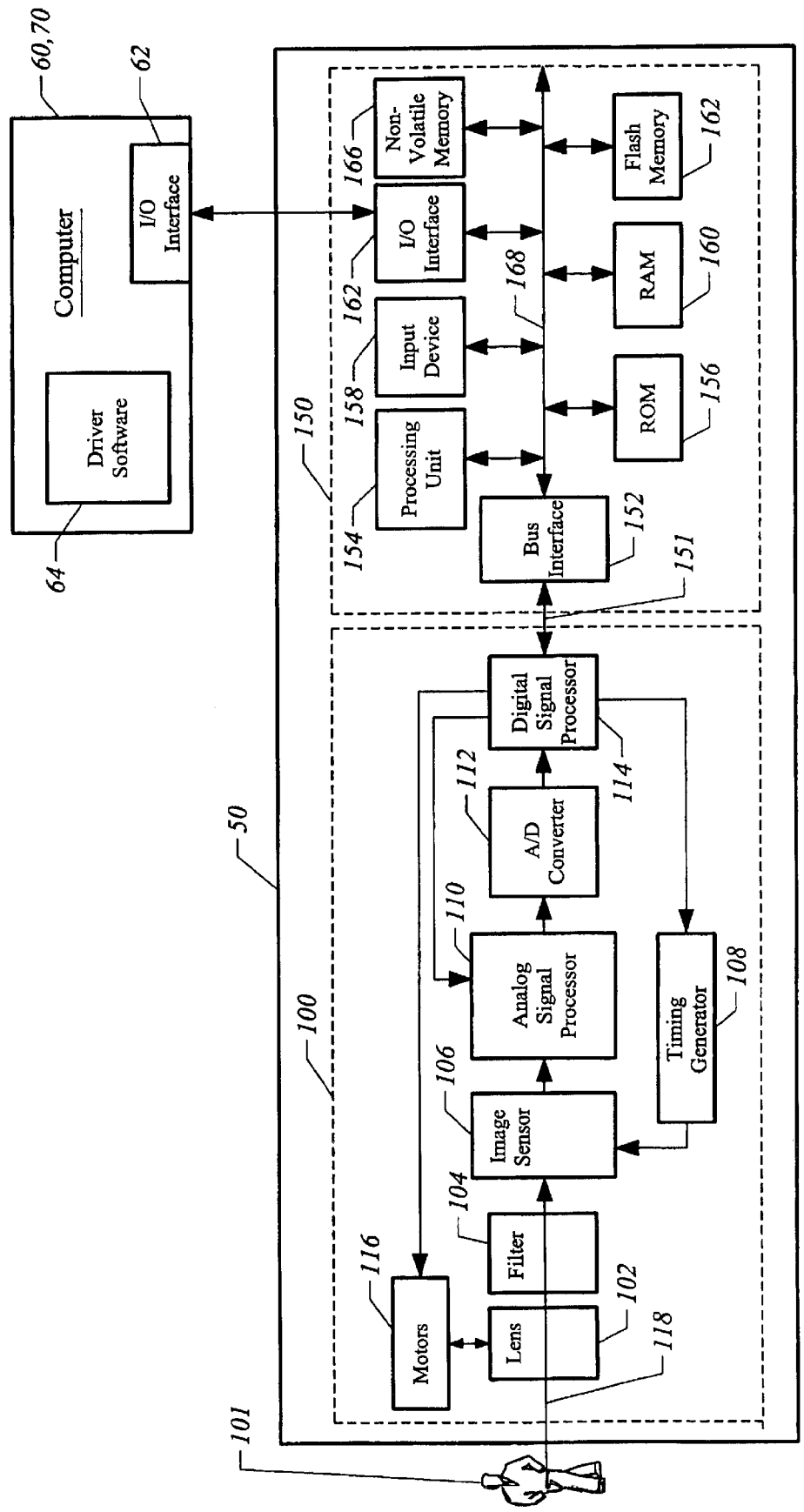
FIG. 1 is a block diagram of a digital camera connected to a computer according to one embodiment of the invention.

Referring to FIG. 1, a digital camera 50 includes an imaging device 100 and a processing system 150. The imaging device includes a lens 102 having an iris, a filter 104, an image sensor 106, a timing generator 108, an analog signal processor (ASP) 110, an analog-to-digital (A/D) converter 112, a digital signal processor (DSP) 114, and one or more motors 116.

In operation, imaging device 100 captures an image of object 101 via reflected light impacting image sensor 106 along an optical path 118. Image sensor 106 generates a set of raw image data representing the captured image. The raw image data is then routed through ASP 110, A/D converter 112 and DSP 114. DSP 114 has outputs coupled to timing generator 108, ASP 110, and motors 116 to control these components. DSP 114 also has its output coupled to processing system 150 via a bus 151. The raw image data are transmitted to system 150 and processed therein.

In one embodiment, processing system 150 includes a bus interface 152, a processor 154, a read-only memory (ROM) 156, an input device 158, a random access memory (RAM) 160, an I/O interface 162, a flash memory 164, a non-volatile memory 166, and an internal bus 168.

Bus interface 152 is a bidirectional first-in, first-out interface for receiving the raw image data and control signals passed between system 150 and DSP 114. Processor 154 executes programming instructions stored in ROM 156 and RAM 160 to perform various operations. ROM 156 generally stores a set of computer readable program instructions which control how processor 154 accesses, transforms and outputs the image data.

Input device 158 generally includes one or more control buttons (not shown) which are used to input operating signals that are translated by processor 154 into an image capture request, an operating mode selection request, and various control signals for imaging device 100. I/O Interface 162 is coupled to internal bus 168 and has an external port connector (not shown) that can be used to couple digital camera 50 to a computer 60 via an I/O interface 62 for viewing and editing the image data stored in flash memory 164. The computer includes a driver software 64 to access the image data stored in the flash memory. In one implementation, I/O interface 62 is a universal serial bus (USB) port.

Flash memory 164 stores the image data processed by the processor. In one implementation, flash memory 164 is a removable flash card or disk 300 (FIG. 3), e.g., SmartMedia™ and CompactFlash™, so that a user may replace a full flash card with a new flash card to store additional image data.

Figure 2:
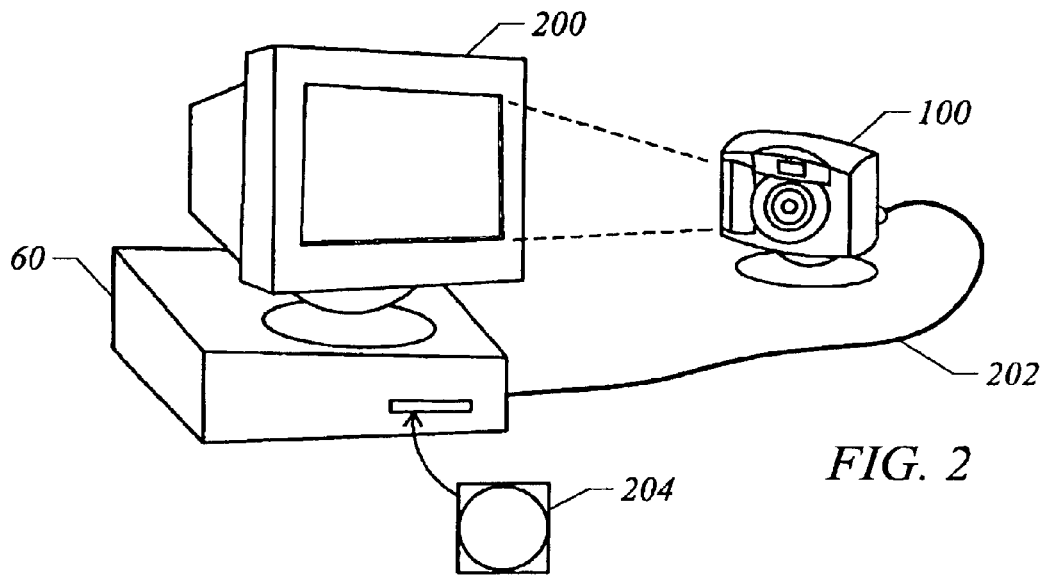
FIG. 2 is a block diagram illustrating the setup of a camera pointing at the display according to an embodiment of the invention.

FIG. 2 illustrates the calibration setup according to an embodiment of the invention. Camera 100 is pointed toward a display 200. The signals from the camera are either sent along a cable 202, or by wireless transmission, to computer 60. Computer 60 is controlled by driver software 64 of FIG. 1, which may be embodied on a CD or floppy disk 204.

In one embodiment, the display setup of FIG. 2 is performed for a typical camera of a particular model of camera at the factory. Display 200 is a high quality display to ensure that the correction factors developed are ones that correspond to the camera, and not to problems with the display. These correction factors are then stored on the driver software on disk 204.

When a customer buys the camera and either loads the driver software from a disk or downloads it over the internet, the same setup as in FIG. 2 is used. Here, display 200 will be the particular display of the user's computer, as opposed to a high-quality display. Accordingly, the calibration system will pick up any errors in the display as well.

In addition, in one embodiment, multiple adjustable elements from the camera will be compensated for. Referring again to FIG. 1, lens 102 may have variations, especially towards the edges of the lens. The calibration method of the present invention allows a plastic lens to be used which can vary from camera to camera, thus not requiring as much expense in selecting lenses which are exact matches on manufacturing. Similarly, the color filters 104 need not exactly match from camera to camera. In addition, the present invention can compensate for the analog gain of analog signal processor 110. Also, a number of digital correction values on the raw RGB values, the color corrected RGB and color balance can be performed in digital signal processor 114, and can also be corrected for to the extent there are variations from camera to camera.

Figure 3:
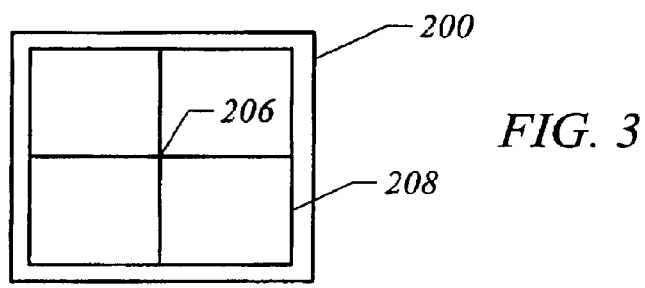
FIG. 3 is a diagram of a cross-hair pattern provided on a computer display.

FIG. 3 illustrates a display 200 having a cross-hair target displayed on it. The cross-hair target crosses at the center of the display 206. The target can also include borders 208. For example, when a green color is provided to the display for calibration, a black target 206 can be provided. By detecting where the target lies on the image received back from the camera, the computer can determine whether the camera is pointed properly at the display. The user can then be instructed to move the camera closer to the display, to the left, up, etc. The borders of the target do not need to exactly match the borders of the camera field of view. Rather, all that is needed is that part of the camera field of view be filled by part of the display, such that the camera being slightly closer is preferable.

Figure 4:
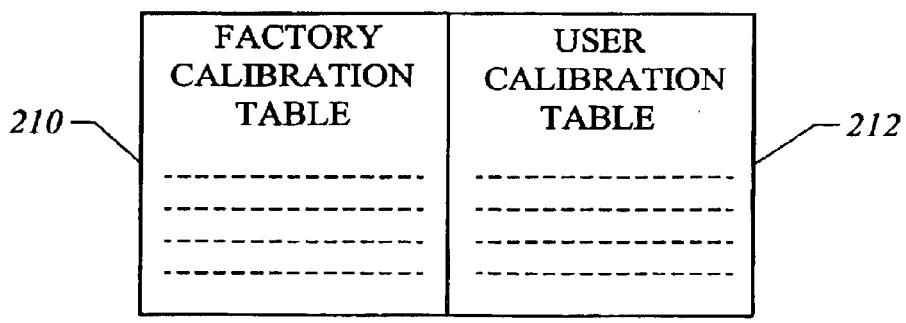
FIG. 4 is a diagram of the factory and user calibration tables according to an embodiment of the invention.

FIG. 4 illustrates the factory calibration and user calibration tables. These are preferably stored in the driver software 64. The factory calibration table 210 stores a calibration number for each of three colors in one embodiment. The calibration value may be stored globally for all elements of the camera sensor, or separate values could be determined and stored for different portions of the sensor. User calibration table 212 stores similar offsets, but simply an offset from the value stored in table 210. Thus, the overall correction is obtained by adding the values from calibration table 210 and table 212.

Figure 5:
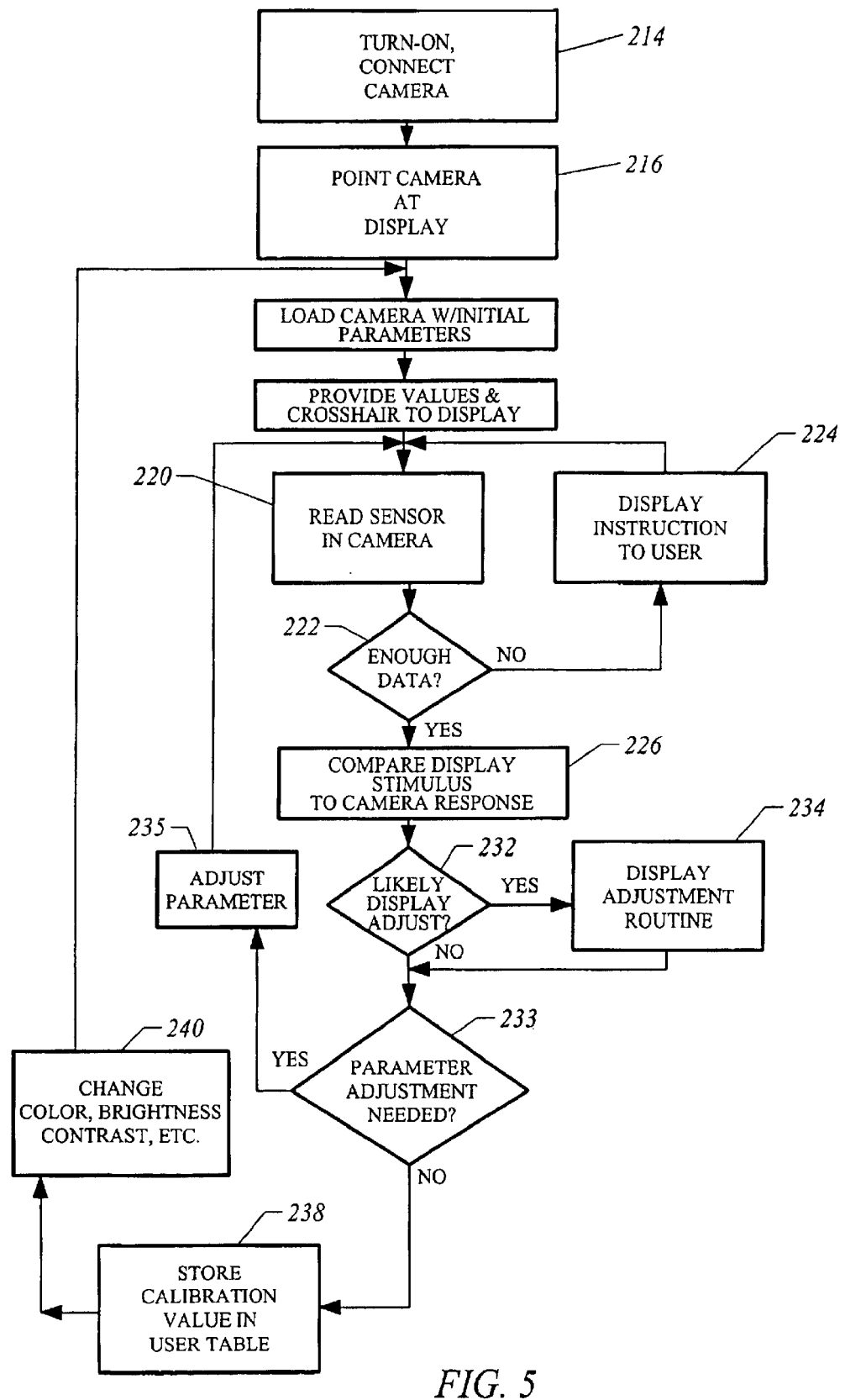
FIG. 5 is a flow chart illustrating the operation of the calibration method according to an embodiment of the invention.

FIG. 5 is a flow chart illustrating the calibration method of the invention at a customer's computer for one color. A similar process can be performed at the factory. However, the factory setup may eliminate the target or cross hair display, and instead have a fixed stand for aligning the camera. In addition, although a correction for a color value is set forth in FIG. 5, the same process would be repeated for different colors, as well as other parameters for which calibration is sought. Examples of such other parameters include brightness and exposure. Exposure calibration can be done by monitoring how much light is detected for different amounts of time. To the extent the sensor (or a portion of the sensor) is off in the amount of brightness or color detected for a particular time period, a correction factor can be stored for that time period.

Referring to FIG. 5, once the set up of FIG. 2 is established with the camera pointing at the computer display, the process is ready to start by turning on the computer and selecting the driver software with the camera connected (step 214). The camera pointed at the display (216), and the camera is loaded with initial parameters (from the factory adjustment, if this is a consumer adjustment). A first color and cross hair is provided to the display (219). The camera image from the camera sensor is then read by the computer, and the position of the cross hair is compared to the position provided on the display (220). If the camera view is not pointed correctly at the display to provide sufficient data for a calibration (222), a display message is provided on the computer to direct the user to reposition the camera (224). The image is then read again (220), and a determination is made again if the user correction has now pointed the camera sufficiently at the display.

Once the camera is correctly aligned, the stimulus provided to the display (e.g., a color value number) is compared to the value detected by the camera (226). If the sensor if off by an unusual amount (232), this may indicate a problem with the display. In this case, a routine for adjusting the display (234) can be run. For example, if the colors are universally dim, it may be determined that the customer needs to adjust the brightness control on the display. Alternately, a color balance on the display may be adjusted. The user can be presented with such an option, so that the user can make an intelligent decision of whether it is the display that needs adjustment.

Once the comparison has been done, a determination is made of whether a parameter adjustment is needed (step 233). If yes, the parameters are adjusted (step 235), and the process is repeated. The driver software can also determine if more precision is needed on a particular color. For example, in order to more precisely determine the amount of adjustment that needs to be stored, it may be desired to transmit a different shade of green when green is the color being used. This will allow for a more precise determination of how much of an adjustment factor is needed by correlating the offset from one shade of green with the offset detected for the other shade of green. In effect, this provides for a fine tuning of the offset value.

If no more adjustment or precision is needed, the calibration values are stored in the user calibration table 212 (step 238). Subsequently, the color is changed, or a different parameter is chosen, such as brightness or contrast (240). The process is then repeated or the process is rerun for a different shade of color before storing the calibration values. The driver software can then compare and see if the values sent to the display now match those reported by the camera. If not, the process can be repeated.

In one embodiment, multiple colors can be determined at one time. For example, a red, green and blue color can be simultaneously sent to the display, with values of 13, 30, 111. The camera will then detect these values using each of the three color filters in the camera. If the same values are 13, 30 and 111 are returned to the computer, no adjustment is needed. To the extent any one of these varies, an adjustment is made. Thus, the calibration of multiple colors can be provided for when a single combined color is sent to the display.

Once the calibration routine has been run through the different colors or parameters that are desired to be calibrated, the procedure can be rerun using the stored calibration offsets to verify that the calibration values are providing the correct results. An example of a color calibration procedure follows:

1. Display 255,255,255—white on all screen (except for a cross hair).
2. The camera detects the cross hair and gives feedback to the user (if necessary).
3. Flash briefly on all screen and record the response for the following:
   a) 0,0,0=black on all screen
   b) 127,127,127 (grey) on all screen
   c) 255,0,0 (full red) and 127,0,0 (half red) on all screen
   d) 0,255,0 (full green) and 0,127,0 (half green) on all screen
   e) 0,0,127 (full blue) and 0,0,127 (half blue) on all screen
4. The computer adjusts camera internal variables.
5. The computer flashes some test colors (x1,y1,z1) and the camera records x2,y2,z2.
6. The computer adjusts camera internal variables until errors (x2−x1), . . . (z2−z1) are within target.

Although the routine may require many steps and different values being provided to the display, the entire routine can be accomplished in a fraction of a second, thereby making it very convenient for a user.

Typically, it has been found that users are reluctant to use cards provided with scanners or other complicated steps for calibrating a camera. The present invention provides a simple method that does not require a calibration card or a special stand for the camera, and can be accomplished very simply within a minimal amount of time.

As will be understood by those skilled in the art, the present invention may be embodied in other specific forms without departing from the essential characteristics thereof. Accordingly, the foregoing description is intended to be illustrated, but not limiting, of the scope of the invention which is set forth in the following claims.

What is claimed is:

1. A method for calibrating a digital camera comprising:
   pointing said digital camera at a display controlled by a computer;
   providing a single display value to at least a majority of pixels of said display;
   receiving sensed image data of said pixels in said digital camera;
   transmitting said image data to said computer;
   determining a difference between a detected value of said image data compared to said display value provided to said display; and
   storing a correction factor if said detected value differs from said display value by more than a predetermined amount,
   wherein said determining a difference comprises:
   determining an average value for each of a plurality of positions in a camera sensor;
   eliminating positions with values differing from said average value by more than a threshold;
   averaging the values of remaining positions after said eliminating; and
   comparing an average of said remaining values to said single display value sent to said display.

2. The method of claim 1 wherein said display value is a color.

3. The method of claim 1 further comprising:
   providing a pattern to said display;
   detecting said pattern with said digital camera;
   transmitting a detected pattern from said digital camera to said computer; and
   determining an alignment of said camera from a position of said detected pattern compared to a position of said pattern on said display.

4. The method of claim 3 further comprising providing a message on said display to move said camera in a direction that will result in a better alignment of said camera with respect to said display.

5. The method of claim 1 wherein said correction factor is a factory correction factor, which is stored in a table provided with driver software for said camera, and further comprising providing a second table for customer correction factors obtained by repeating the steps of claim 1 by a customer.

6. The method of claim 1 wherein each of said plurality of positions comprises a plurality of sensor sites.

7. A method for calibrating a digital camera comprising:

pointing said digital camera at a display controlled by a computer;

activating said display with display color;

receiving image data of said pixels in said digital camera;

transmitting said image data to said computer;

determining a difference between a detected color in said image data compared to said display color provided to said display;

storing a correction factor if said detected color differs from said display color by more than a predetermined amount;

wherein said correction factor is a factory correction factor, which is stored in a table provided with driver software for said camera, and further comprising providing a second table for customer correction factors obtained by repeating the steps for a calibration by a customer, with said calibration by a customer including providing a pattern to said display;

detecting said pattern with said digital camera;

transmitting a detected pattern from said digital camera to said computer;

determining an alignment of said camera from a position of said detected pattern compared to a position of said pattern on said display; and providing a message on said display to move said camera in a direction that will result in a better alignment of said camera with said display, wherein said determining a difference comprises:

determining an average value for each of a plurality of positions in a camera sensor;

eliminating positions with values differing from said average value by more than a threshold;

averaging the values of remaining positions after said eliminating; and comparing an average of said remaining values to said single display value sent to said display.

8. A computer readable media for use in calibrating a digital camera, said media including encoded instructions for:

activating at least a majority of the pixels of a display with a single display value;

receiving sensed image data from said digital camera;

determining a difference between a detected value of said image compared to said display value provided to said display; and storing a correction factor if said detected value differs from said display value by more than a predetermined amount, wherein said instructions for said determining a difference step includes:

code for determining an average value for each of a plurality of positions in a camera sensor;

code for eliminating positions with values differing from said average value by more than a threshold;

code for averaging the values of remaining positions after said eliminating; and code for comparing an average of said remaining values to said single display value sent to said display.

9. The media of claim 8 wherein said display value is a color.

10. The media of claim 8 wherein said media further comprises encoded instructions for:

providing a pattern to said display;

receiving a detected pattern from said digital camera and providing said detected pattern to said computer; and determining an alignment of said camera with respect to said display from a position of said detected pattern compared to a position of said pattern on said display.

11. The media of claim 10 wherein said media further comprises instructions for providing a message on said display to move said camera in a direction that will result in a better alignment of said camera with said display.

12. The media of claim 8 wherein said correction factor is a factory correction factor, which is stored in a table provided with driver software for said camera, and wherein said media further comprises encoded instructions for providing a second table for customer correction factors obtained by repeating the steps of claim 9 by a customer.

* * * * *